United States Patent [19]

Scharres

[11] Patent Number: 4,949,450

[45] Date of Patent: Aug. 21, 1990

[54] INSULATED BLIND RIVET MOUNTING AND METHOD OF MAKING

[76] Inventor: Harry J. Scharres, 41 Poplar Place, LaGrange, Ill. 60525

[21] Appl. No.: 144,323

[22] Filed: Jan. 14, 1988

[51] Int. Cl.$^5$ .................. B21D 39/20; F16B 13/06
[52] U.S. Cl. ..................... 29/523; 29/524.1; 29/845; 174/153 R; 403/408.1; 411/43; 411/70; 411/903
[58] Field of Search ............ 411/43, 44, 70, 338, 411/339, 907, 908, 903; 403/408.1; 174/153 R; 29/842, 845, 526.2, 523, 524.1, 509

[56] References Cited

U.S. PATENT DOCUMENTS

| | | | |
|---|---|---|---|
| 2,092,358 | 9/1937 | Robertson | 411/44 X |
| 2,456,118 | 12/1948 | Foster | 29/523 |
| 3,179,920 | 4/1965 | McGinty | 174/153 |
| 3,300,798 | 1/1967 | York | 29/509 R |
| 3,491,649 | 1/1970 | Smouton et al. | 441/43 |
| 4,761,860 | 8/1988 | Krauss | 411/339 X |

FOREIGN PATENT DOCUMENTS

| | | | |
|---|---|---|---|
| 472329 | 9/1937 | Fed. Rep. of Germany | 411/70 |
| 1920839 | 11/1970 | Fed. Rep. of Germany | |
| 1956356 | 10/1971 | Fed. Rep. of Germany | 403/408 |
| 724509 | 1/1932 | France | 411/43 |
| 890369 | 11/1943 | France | 411/44 |
| 594859 | 11/1947 | United Kingdom | 411/43 |
| 625331 | 6/1949 | United Kingdom | 411/70 |
| 671811 | 5/1952 | United Kingdom | 29/523 |
| 815135 | 6/1959 | United Kingdom | 174/153 |
| 1551040 | 8/1979 | United Kingdom | 29/842 |

Primary Examiner—Lloyd A. Gall

[57] ABSTRACT

An insulated blind rivet mounting arrangement in an aperture in a wall including a blind rivet having a tubular rivet member and a actuating rod that is disposed within the tubular member and is adapted for axial withdrawal therefrom; an insulating sheath made of non-electrically conductive material positioned over said tubular rivet member; and said blind rivet actuating rod being removable from said tubular rivet member for expanding the tubular rivet member and insulating sheath into tight interfitting relation with each other within the wall aperture. Alternative embodiments are disclosed in which one or more coaxially disposed tubular flanged members are utilized to complete the mounting, with the insulating sheath being effective to thermally and electrically insulate the tubular rivet member. The insulating sheath, which preferably is made of a resilient plastic material, also is effective for creating a substantially vibration-free mounting within the wall aperture.

23 Claims, 5 Drawing Sheets

INSULATED BLIND RIVET MOUNTING AND METHOD OF MAKING

BACKGROUND OF THE INVENTION

1. Field of the Invention

The present invention relates generally to blind rivet type fasteners, and more particularly, to improved mounting and connecting arrangements utilizing such type fasteners.

2. Description of the Prior Art

Fasteners known as blind rivets are used in numerous mounting and fastening applications. The blind rivet fastener typically comprises a metallic tubular rivet member having an outwardly extending mounting flange at one end and an actuating rod that extends axially through the tubular rivet member and has an enlarged end or head disposed adjacent the opposite or terminal end of the tubular rivet member. The tubular rivet member may be positionable, for example, through aligned apertures in a pair of plates to be secured together, with the flanged end thereof adjacent one side of the plates and the opposite or terminal end thereof extending through the other side of the plates. Upon axial withdrawal of the actuating rod, the enlarged head thereof causes the terminal end of the tubular rivet member to be expanded, such that the plates are retained between the expanded and flanged ends of the tubular rivet member. Withdrawal of the rod typically is effected by a manually or automatically operated tool, and the force of the withdrawal movement of the rod causes the enlarged head to break off so as to either be retained in the expanded end of the tubular rivet member or to fall free of the completed connection.

Although blind rivet type fasteners have been advantageously used in numerous fastening and mounting applications, heretofore there are many applications for which they have been deemed unsuitable, or for which they have not been easily adaptable. For example, because the tubular rivet member is metallic, such fasteners have been unsuitable in electrical applications in which it is necessary that there be no electrical contact between the fastener and the wall or plates being secured. Likewise, because of the relatively high heat conductivity of the metallic tubular rivet member, blind rivet fasteners may be unsuitable in applications that cannot tolerate heat transfer through the fastener. In addition, it has been difficult to achieve connections in which the tubular rivet member is firmly retained in the mounting aperture without some relative movement or vibration, particularly when the fastener is secured in an aperture in relatively hard material, such as metal. For similar reasons, conventional blind rivets have not been suitable for applications where sound conductivity through the fastener must be minimized.

SUMMARY OF THE INVENTION

It is an object of the present invention to provide an insulated blind rivet mounting arrangement that is easily adaptable for applications heretofore considered unsuitable for blind fasteners.

Another object is to provide a blind rivet mounting arrangement as characterized above that is adaptable for preventing electrical conductivity through the connection.

A further object is to provide a blind rivet mounting arrangement of the foregoing type that includes a thermal insulating barrier for preventing heat transfer through the connection.

Still another object is to provide a blind rivet mounting arrangement which is adapted for vibration-free securement in mounting apertures in even relatively hard materials, such as metal.

Another object is to provide a blind rivet mounting arrangement which limits sound conductivity through the fastener.

Still a further object is to provide a blind rivet mounting arrangement which is relatively simple in design and lends itself to economical manufacture and use.

A further object is to provide a method of making of an insulated connection of the foregoing type.

BRIEF DESCRIPTION OF THE DRAWING

Other objects and advantages of the invention will become apparent upon reading the following detailed description and upon reference to the drawings, in which.

DESCRIPTION OF THE PREFERRED EMBODIMENTS

While the invention is susceptible of various modifications and alternative constructions, a certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

Figure 1:
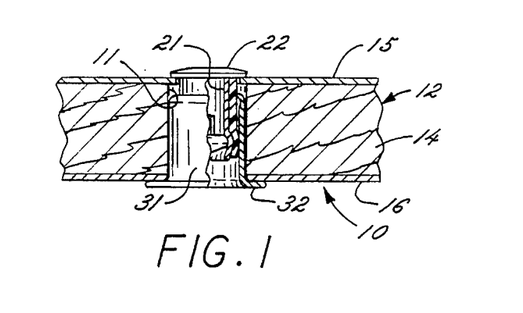
FIG. 1 is a vertical section of an illustrated mounting arrangement in accordance with the present invention.
Figure 2:
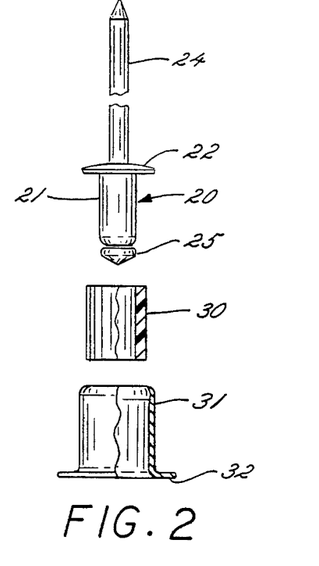
FIGS. 2 and 3 illustrate the method of making the mounting arrangement shown in FIG. 1.

Referring now more particularly to FIG. 1 of the drawings, there is shown an illustrative mounting arrangement 10 in accordance with the invention, in this case being applied through an aperture 11 in a wall 12. The wall 12 in this instance comprises a central insulating layer 14 having metallic or electrically conductive surfaces 15, 16 on opposed sides thereof. The mounting arrangement 10 includes a blind rivet 20, which as shown FIG. 2 comprises a metallic tubular rivet member 21 having an outwardly extending flange 22 at one end and an actuating rod 24 that extends axially through the tubular rivet member and has an enlarged rounded end or head 25 disposed adjacent the opposite or terminal end of the tubular rivet member 21. It will be understood that the blind rivet 20 may be of a conventional type, such as the blind fastener sold under the trademark POP RIVET by Emhart Fastener Group, of Sheldon, Connecticut. As is known in the art, the actuating rod 24 of such blind rivet may be axially withdrawn from the tubular rivet member 21 by an appropriate tool, causing the enlarged head 25 to expand the terminal end of the tubular rivet member 21 and to break off the head 25 from the rod during the course of the withdrawal process.

Figure 3:
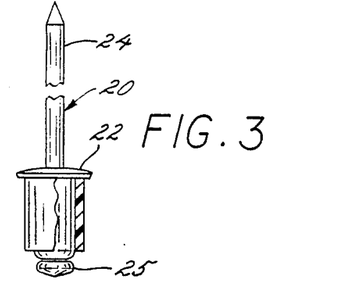

In accordance with the invention, means are provided for electrically and thermally insulating the metallic tubular rivet member within the wall mounting. To this end, in the illustrated embodiment, a tubular insulating sheath 30, which may be made of a resilient plastic material, is positioned over the tubular rivet member 21, as is shown in FIG. 3, preferably in relatively tight fitting relation, prior to the positioning of the blind rivet 20 into the mounting aperture 11. The blind rivet 20 and insulating sheath 30 may thereupon be positioned into the aperture 11 from one side of the wall 12 with the mounting flange 22 of the tubular rivet member 21 adjacent the side 15 of the wall. The tubular rivet member 21 and insulating sheath 30 in this case are received in a second tubular member or eyelet 31, which like the tubular rivet member 21 may be made of metal and has an outwardly extending mounting flange 32 that is positionable adjacent an opposite side 16 of the wall 12. With the tubular rivet member 21 and insulating sheath 30 disposed within the second tubular member 31, the actuating rod 24 may be withdrawn from the tubular rivet member 21 by a manual or automated tool as is known in the art, for causing the enlarged head 25 thereof to be drawn into the tubular rivet member 21, causing expansion of the tubular rivet member 21 and sheath 30 into tight interfitting relation with the second tubular member 31, with the tubular rivet member 21 and second tubular member 31 being positively retained within the mounting aperture 11 by the flanges 22, 32 and being insulated from each other by the sheath 30. As is known in the art, during the course of withdrawal of the rod 24, the enlarged head 25 may be severed from the rod and either drop from the formed connection or be retained in the completed connection.

It will be appreciated that in the completed mounting arrangement 10 the flanged end 22 of the tubular rivet member 21 is in electrical contact with the metallic surface 15 on one side of the wall and the flanged end 32 of the second tubular member 31 is in electrical contact with the metallic surface 16 on the opposite side of the wall 12, with the insulating sheath 30 insulating the rivet member 21 and second tubular member 31 from each other, and thus, maintaining an electrically insulated separation between the wall surfaces 15, 16. The insulating sheath 30 further forms a thermal insulating barrier between the tubular rivet member 21 and second tubular member 31, and thus, between the opposite metallic surfaces 15, 16 of the wall 12. Because of the resiliency of the plastic sheath 30, the frictional bond between the tubular rivet member 21 and second tubular member 31 is substantially vibration-free. While not essential to the mounting arrangement 10 illustrated in FIG. 1, axial withdrawal of the actuator rod 24, in addition to expanding the tubular rivet member 21 and insulating sheath 30, preferably also expands the second tubular member 31, at least slightly, so that it is in relatively tight fitting relation within the wall aperture 11.

Figure 4:
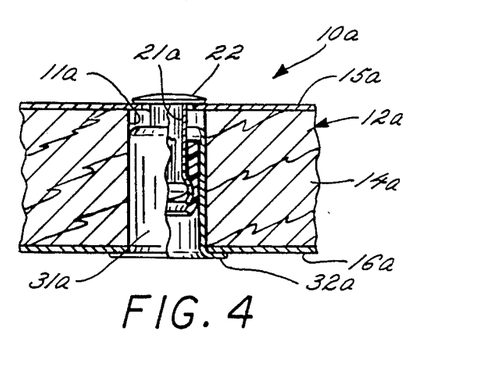
FIG. 4 is a vertical section of an alternative embodiment of mounting arrangement in accordance with the present invention.
Figure 5:
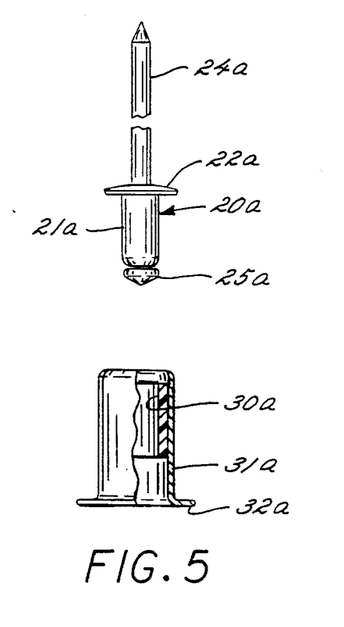
FIG. 5 illustrates the method of making the mounting arrangement shown in FIG. 4.

Referring now to FIG. 4, there is shown an insulated mounting arrangement 10a substantially identical to that described above, formed by a modified method, wherein items similar to those described above have been given similar reference numerals with the distinguishing suffix "a" added. In this instance, as depicted in FIG. 5, the insulating sheath 30a is first positioned within the second tubular member 31a, preferably in relatively tight fitting relation, and this assembly is thereupon positioned into the mounting aperture 11a from one side of the wall 12, and the tubular rivet member 21a is then positioned into the insulating sheath 30a and second tubular member 31a from the opposite side of the wall. Withdrawal of the actuating rod 24a completes the connection, which is substantially similar to that shown in FIG. 1, in that the tubular rivet member 21a is firmly retained in thermally and electrically isolated relation within the second tubular rivet member 31a with the sheath disposed therebetween.

Figure 6:
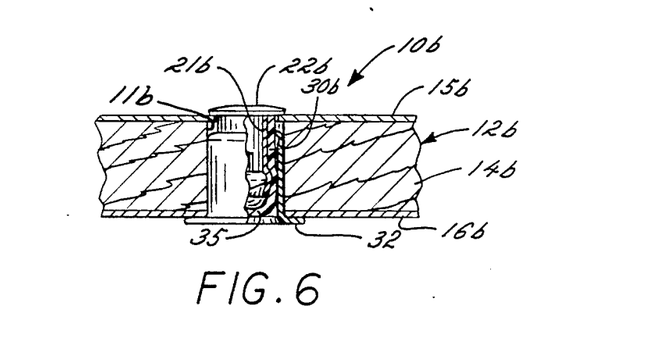
FIG. 6 is a vertical section of still another alternative embodiment of mounting arrangement in accordance with the invention.
Figure 7:
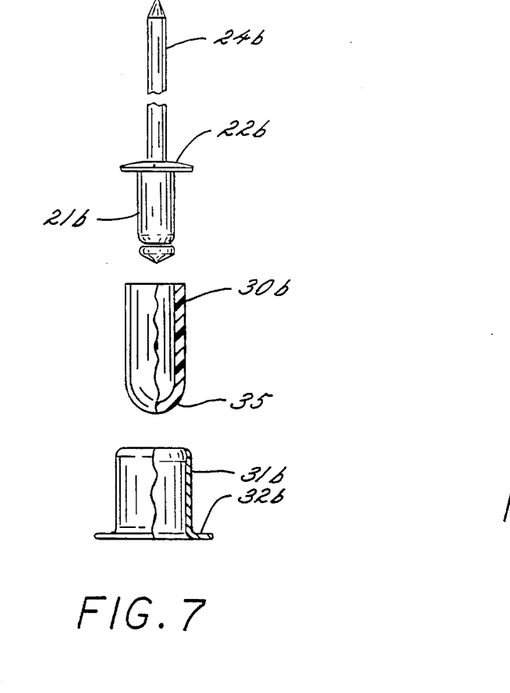
FIGS. 7 and 8 illustrate the method of making the mounting arrangement shown in FIG. 6.
Figure 8:
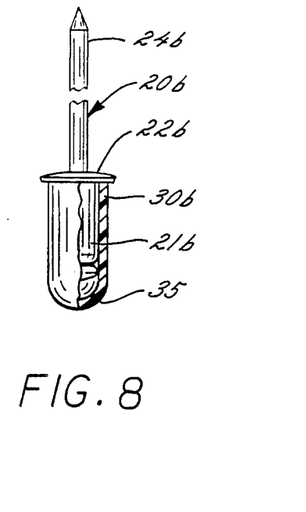

Referring now to FIGS. 6-8, there is shown another alternative embodiment of mounting arrangement 10b, which is adapted for preventing passage of vapor and liquid through the mounting aperture. The mounting arrangement 10b is substantially similar to that shown in FIG. 1 except the insulating sheath 30b has a closed end 35. The open end of the sheath 30b in this instance is positionable into tight-fitting relation over the tubular rivet member 20b, as shown in FIGS. 7 and 8, and this assembly is then positioned into the wall aperture 11b from one side thereof and is received in a second tubular member 31b that is positioned in the wall aperture from the other side thereof, as previously described. Withdrawal of the actuating rod 24b causes expansion of the tubular rivet member 21b and insulating sheath 30b into tight interfitting relation within the second tubular member 31b, again as previously described, with the closed end 35 of the sheath 30b creating a vapor seal through the aperture. It will be understood that alternatively the insulating sheath 30b could be positioned within the second tubular member 31b with the tubular rivet member 21b thereupon being positioned into the insulating sheath 30b and second tubular member 31b.

Figure 9:
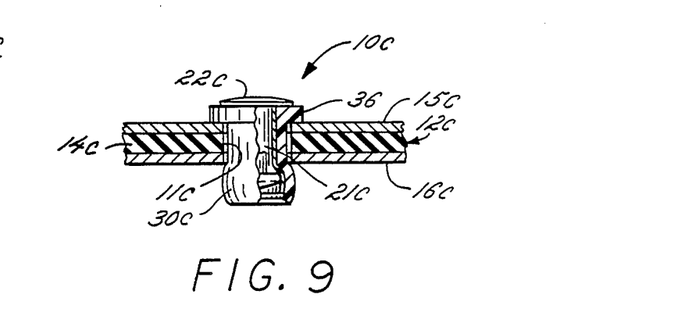
FIG. 9 is a vertical section of a further alternative embodiment of mounting arrangement.
Figure 10:
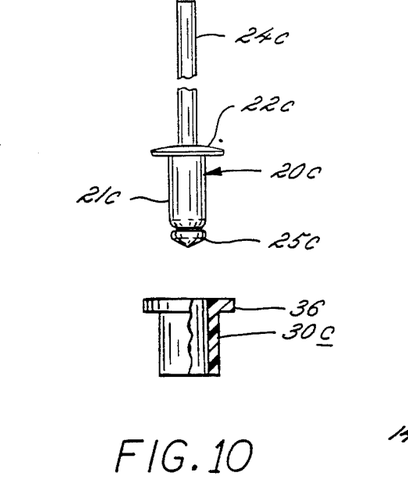
FIG. 10 illustrates the method of making the mounting arrangement shown in FIG. 9.

Referring now to FIGS. 9 and 10 there shown a substantially vibration-free mounting arrangement 10c in which the tubular rivet member 21c is maintained in thermally and electrically isolated the relation to the wall 12c, which again comprises a central layer 14c of insulating material with metallic or electrically conductive surfaces 15c, 16c on opposite sides thereof. An insulating sheath 30c having an outwardly extending flange 36 is positionable over the tubular rivet member 21c with the flange 36 of the sheath 30c adjacent the flange 22c of the tubular rivet member. This assembly is then positioned into the wall aperture 11c with the insulating sheath flange 36 interposed between the metallic surface 15c of the wall 12 and the tubular rivet member flange 22c and the opposite or terminal ends of the tubular rivet member 21c and sheath 30c extend outwardly beyond the opposite side 16c of the wall 12. Withdrawal of the actuating rod 24c expands the outwardly extending ends of the tubular rivet member 21c and insulating sheath 30c into rigid, substantially vibration-free engagement with the wall aperture, with the mounting being positively retained within the aperture 11c between the flanges 36, 22c of the sheath 30c and tubular rivet member 21, respectively and the outwardly expanded ends of the tubular rivet member 21c and insulating sheath 30c.

Figure 11:
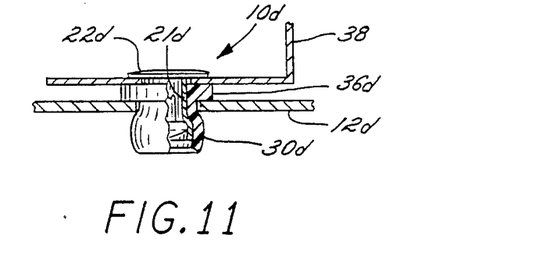
FIGS. 11-14 depict further alternative embodiments of mounting arrangements according to the present invention.

Referring now to FIG. 11, there is shown a mounting arrangement 10d, substantially similar to that shown in FIG. 9, in which a metallic lead or mounting plate 38 is secured between the outwardly extending flange 22d of the tubular rivet member 21d and the outwardly extending flange 36d of the insulating sheath 30d so as to be in thermally and electrically isolated relation to the wall 12d.

Figure 12:
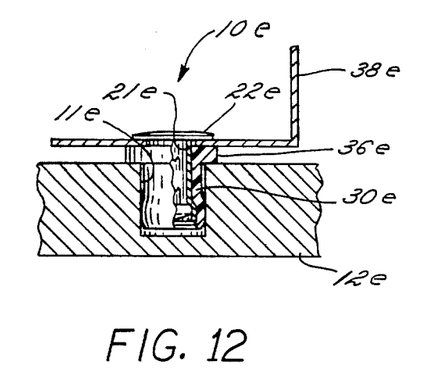

Referring now to FIG. 12, there is shown still another embodiment of a mounting arrangement 10e in accordance with the invention, in this case being mounted in a blind hole or aperture 11e that does not extend completely through the wall 12e. The tubular rivet member 21e with metallic mounting or lead plate 38e secured in interposed relation between the outwardly extending flange 22e of the tubular rivet member 21e and the outwardly extending flange 36e of the sheath 30e are positionable into the blind aperture 11e. Upon withdrawal of the actuating rod 24e of the blind rivet 20e the terminal or lowermost ends of the tubular rivet member 21e and insulating sheath 30e are expanded into tight, vibration-free, engagement with the interior walls of the aperture 11e with the sheath 30e electrically and thermally isolating the tubular rivet member 21e and metallic plate 38e from the wall 12e.

Figure 13:
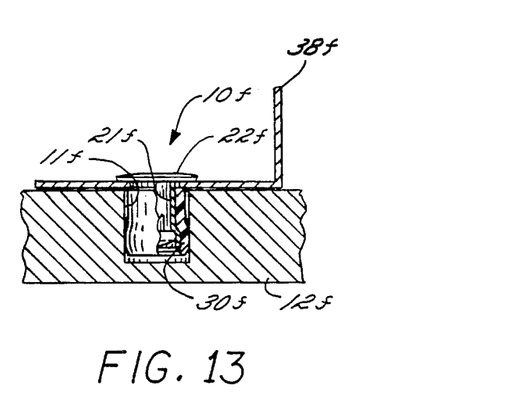

Referring now to FIG. 13, there is shown a mounting arrangement 10f in a blind hole 11f substantially similar to FIG. 12, except that the sheath 30f does not have an outwardly extending flange so that the metallic piece 38f is secured in electrical conducting relation with the wall 12f.

Figure 14:
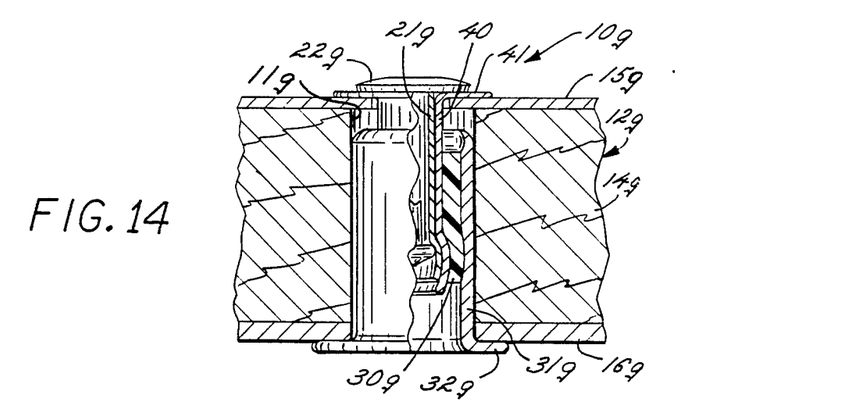
Figures 15, 16:
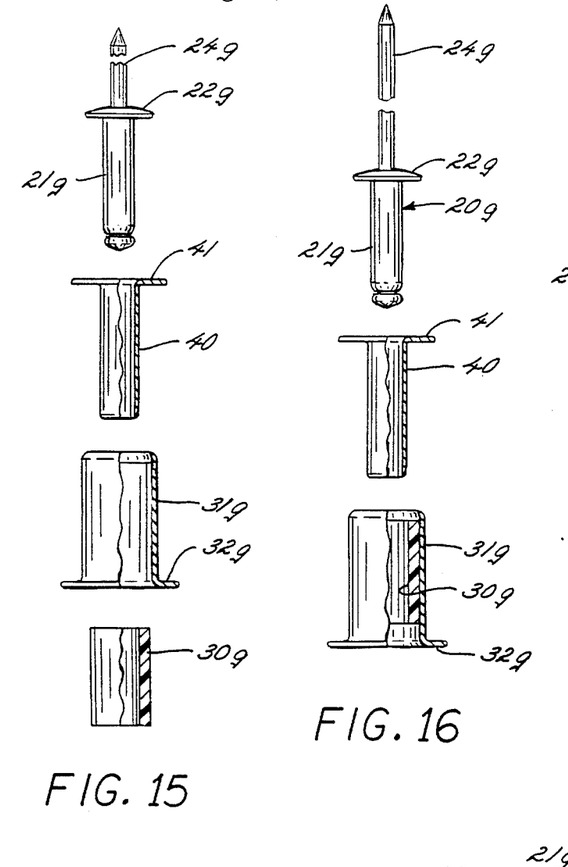
FIGS. 15-17 illustrate the method of making the mounting arrangement shown in FIG. 14.
Figure 17:
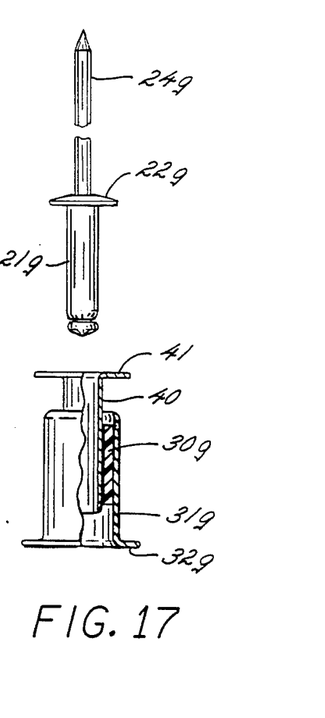

Referring now to FIG. 14, there is shown still another embodiment of mounting arrangement 10g in which a pair of flanged tubular members 31g, 40 are utilized with an insulating sheath 30g interposed therebetween. The insulating sheath 30g may be placed within the flanged tubular member 31g, as shown in FIGS. 15 and 16, which is thereupon positioned in the wall aperture 11g with the flange 32g of the tubular member 31g disposed adjacent one side 16g of the wall 12g and the tubular member 40 is positioned into the insulating sheath 30g with its outwardly extending flange 41 adjacent the opposite side 15g of the wall, as shown in FIG. 17. The tubular rivet member 21g is then positioned within the tubular member 40, and upon withdrawal of the actuating rod 24g, causes the tubular rivet member 21g, tubular member 40, insulating sheath 30g, and tubular member 31g, to be expanded into tight interfitting engagement with the aperture 11g, with the mounting being positively retained within the wall aperture between the outwardly extending flange 32g of the tubular member 31g on one side and the outwardly extending flanges 22g, 41 of the tubular member 21g and tubular rivet member 40, respectively, on the other side. The tubular rivet member 21g and tubular member 40 in this case are in electrically conductive relation with the metallic wall surface 15g and are thermally and electrically insulated from the tubular member 31g which is in contact with the metallic surface 16g on the opposite side of the wall.

Figure 18:
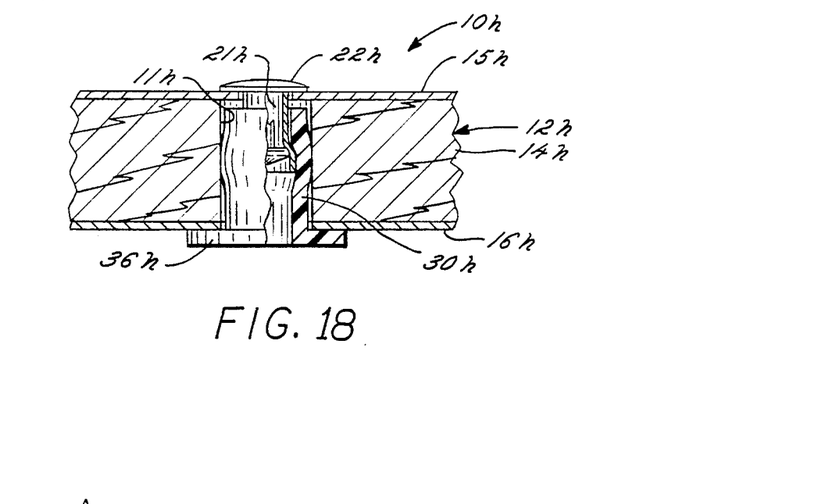
FIG. 18 is still another alternative embodiment of mounting arrangement according to the invention.
Figure 19:
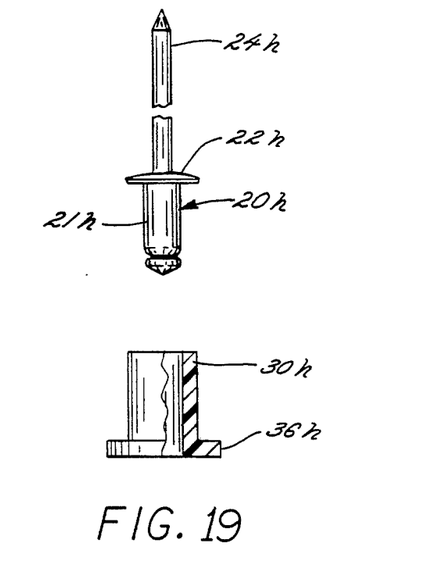
FIG. 19 illustrates the method of making the mounting arrangement shown in FIG. 18.

Referring now to FIG. 18, there is shown another embodiment of mounting arrangement 10h according to the invention wherein the mounting is positively retained within the wall aperture 11h between an outwardly extending flange 22h of the tubular rivet member 21h and an outwardly extending flange 36h of the insulating sheath 30h. The insulating sheath 30h is positioned into the wall aperture 11h from one side 16h of the wall, with its outwardly extending flange 36h adjacent the wall surface. The tubular rivet member 21h is then positioned into the wall aperture 11h and insulating sheath 30h from the opposite side of the wall, and upon removal of the actuating rod 24h, expands the tubular rivet member 21h and insulating sheath 30h into securely mounted relation in the wall aperture, with the mounting being positively retained by the flanges 22h, 36h of the tubular rivet member and insulating sheath.

From the foregoing, it can be seen that the present invention provides a multiplicity of blind rivet mountings which are adapted to electrically and thermally isolate the tubular rivet member from the wall and/or other elements of the connection. The mounting arrangements also are adapted for providing substantially vibration-free securement of the blind rivet member within the wall aperture and for minimizing sound conductivity through the connection. The mountings further are of relatively simple and economical construction and are easy to install.

I claim as my invention:

1. A method of making an insulated connection in an aperture of a wall comprising the steps of positioning at least partially into the aperture a metallic blind rivet having a metallic tubular rivet member and an actuating rod that is disposed in the tubular rivet member and adapted for axial withdrawal movement therefrom, positioning a non-metallic insulating sheath over the tubular rivet member, and withdrawing the actuating rod from said blind rivet to expand a portion of said tubular rivet member and insulating sheath into tight interfitting relation with each other in said aperture with said sheath insulating said tubular rivet member from said wall, said expanded rivet portion being located intermediate the ends of said rivet and entirely within said wall aperture and being effected in response to withdrawal of said rod without deformation of any portion of said rivet extending outside of said wall aperture.

2. A method of making an insulated connection is an aperture in a wall comprising the steps of positioning into the aperture from one side of said wall a blind rivet having a tubular rivet member and an actuating rod that is disposed in the tubular rivet member and adapted for axial withdrawal movement therefrom, positioning an insulating sheath over the tubular rivet member, positioning a second tubular member into said aperture from an opposite side of said wall with said tubular rivet member positioned within said second tubular member and said insulating sheath being disposed between said second tubular member and tubular rivet member, and withdrawing the actuating rod from said blind rivet to expand said tubular rivet member and insulating sheath into tight interfitting relation with each other within said second tubular member and within said aperture.

3. An insulated connection for mounting in an aperture in a wall comprising a blind tubular rivet member positioned in said aperture; an insulating sheath made of non-electrically conductive material positioned over said tubular rivet member; a second tubular member positionable into said aperture; said insulating sheath being disposed between said tubular rivet member and said second tubular member for preventing contact between said tubular rivet member and said second tubular member and wall; said tubular rivet member and insulating sheath having portions expanded into tight interfitting relation with each other; and said expanded portions of said tubular rivet member and said sheath being located entirely within said aperture intermediate opposite sides of said wall.

4. An insulated connection for mounting in an aperture in a wall comprising a blind tubular rivet member positioned in said aperture and having an outwardly flanged end adjacent one side of said wall, an insulating sheath made of non-electrically conductive material positioned over said tubular rivet member, a second tubular member having an outwardly flanged end adjacent an opposite side of said wall, said insulating sheath being disposed between said tubular rivet member and said second tubular member for preventing contact between said tubular rivet member and said second tubular member; and said tubular rivet member and insulating sheath having portions expanded into tight interfitting relation within said second tubular member and within said wall.

5. An insulated mounting arrangement comprising a wall having electrically conductive surfaces on opposite sides thereof separated by an insulating layer and being formed with an aperture therein, a blind rivet having a tubular rivet member and a rod which is disposed within said tubular rivet member and is adapted for axial withdrawal therefrom, said tubular rivet member being positionable in said aperture and having an outwardly flanged end adjacent one of said electrically conductive sides of said wall, a second tubular member having an outwardly flanged end adjacent the opposite electrically conductive side of said wall, an insulating sheath made of non-electrically conductive material disposed between said tubular rivet member and said second tubular member, and means responsive to axial withdrawal of said rod from said tubular rivet member for expanding said tubular rivet member and insulating sheath into tight fitting relation with said second tubular member in said wall aperture, with said tubular rivet member and second tubular member being insulated from each other by said sheath.

6. The mounting arrangement of claim 5 including a further flanged tubular member positionable in said wall aperture with said flange thereof adjacent the flange of said tubular rivet member, and said sheath being interposed between said further tubular member and said second tubular member.

7. An insulated connection for mounting in an aperture in a wall comprising a blind rivet having a tubular rivet member and a rod which is disposed within said tubular rivet member and is adapted for axial withdrawal therefrom; said tubular rivet member being positionable in said aperture; a second tubular member positionable in said aperture in coaxial relation to said tubular rivet member; an insulating sheath made of non-electrically conductive material disposed between said second tubular member and said tubular rivet member for preventing contact therebetween; and means responsive to axial withdrawal of said rod from said tubular rivet member for expanding said tubular rivet member and insulating sheath into tight interfitting relation, with said tubular rivet member and second tubular member being insulated from each other by said sheath.

8. The insulated connection of claim 7 in which prior to withdrawal of said rod from said tubular rivet member, said insulating sheath is tightly assembled over said tubular rivet member and said tubular rivet member and insulating sheath are loosely positioned within said second tubular member.

9. The insulated connection of claim 7 in which prior to withdrawal of said rod from said tubular rivet member, said insulating sheath is tightly positioned within said second tubular member, and said tubular rivet member is loosely positioned within said insulating sheath.

10. The insulated connection of claim 7 in which said tubular rivet member has an outwardly flanged end adjacent one side of said wall, and said second tubular member has an outwardly flanged end adjacent an opposite side of said wall such that upon withdrawal of said rod said tubular rivet member, sheath, and second tubular member are captively retained in said wall aperture by said flanges.

11. The insulated connection of claim 7 in which said insulating sheath is closed at one end, and said tubular rivet member is positioned into an open end of said sheath.

12. The insulated connection of claim 7 in which said means responsive to withdrawal of said rod is operative for expanding said tubular rivet member, insulating sheath, and second tubular member into tight engagement with the wall aperture.

13. An insulated mounting arrangement comprising a wall having an aperture therein, a metallic blind rivet having a metallic tubular rivet member and a rod which is disposed within said tubular rivet member and is adapted for axial withdrawal therefrom; said tubular rivet member being positionable at least partially into said aperture; a non-metallic insulating sheath disposed about said tubular rivet member, means responsive to axial withdrawal of said rod from said tubular rivet member for expanding a portion of said tubular rivet member and insulating sheath into tight interfitting relation with each other in said wall aperture with said sheath insulating said tubular rivet member from said wall, and said expanded rivet portion being located intermediate the ends of said rivet and entirely within said wall aperture and being effected in response to withdrawal of said rod without deformation of any portion of said rivet extending outside of said wall aperture.

14. The mounting arrangement of claim 13 in which said aperture extends through said wall.

15. The mounting arrangement of claim 13 in which said aperture is a blind hole extending partially into said wall.

16. The wall mounting arrangement of claim 13 in which said means responsive to withdrawal of said rod expands said tubular rivet member and sheath into tight fitting vibration-free engagement with said wall aperture.

17. The mounting arrangement of claim 13 in which said tubular rivet member has an outwardly extending flange adjacent one side of said wall, and said insulating sheath has an outwardly flared flange adjacent an opposite side of said wall, such that said tubular rivet member and insulating sheath are captively retained in said wall aperture by said flanges.

18. The mounting arrangement of claim 17 in which an electrical conductive plate is retained between the outwardly extending flange of said tubular rivet member and the outwardly extending flange of said insulating sheath.

19. An insulated connection for mounting in an aperture in a wall comprising a blind tubular rivet member positioned in said aperture; a second tubular member positioned in said aperture in coaxial relation to said tubular rivet member; an insulating sheath made of non-electrically conductive material disposed between said second tubular member and tubular rivet member for preventing contact therebetween; said tubular rivet member and insulating sheath having portions expanded into tight interfitting relation with each other within said second tubular member; and said expanded portions of said tubular rivet member and sheath being located entirely within said aperture intermediate opposite sides of said wall.

20. The method of making an insulated connection in a wall aperture comprising positioning a blind rivet having a flanged tubular rivet member and an axially withdrawable actuating rod into the wall aperture with the flange of said tubular rivet member adjacent one side of the wall, positioning a second flanged tubular member into said aperture from an opposite side of the wall with the flange of said second tubular member adjacent said opposite wall side and with said tubular rivet member received within said second tubular member, positioning an insulating sheath in interposed relation between said tubular rivet member and second tubular member, and axially withdrawing said actuating rod from said tubular member to expand said tubular member and insulating sheath into tight fitting relation within said second tubular member so that said tubular rivet member and second tubular member are captively retained within said aperture between said flanges with said sheath disposed in insulating relation therebetween.

21. The method of claim 20 including positioning said insulating sheath into relatively tight fitting relation onto said tubular rivet member prior to positioning of said tubular rivet member into said wall aperture.

22. The method of claim 20 including positioning said sheath in relatively tight fitting relation within said second tubular member prior to positioning of said second tubular member into said aperture.

23. The method of claim 20 including positioning a further flanged tubular member onto said tubular rivet member with the flange of said further tubular member in adjacent relation to the flange of said tubular rivet member, positioning said insulating sheath between said further tubular member and said second tubular member such that upon withdrawal of said actuating rod said tubular rivet member, said further tubular member, and insulating sheath are expanded into tight innerfitting relation with said second tubular member and said connection is positively retained within said wall aperture between the flanges of said second tubular member and further tubular member.

* * * * *